(12) United States Patent
Mazzitelli

(10) Patent No.: US 10,038,717 B2
(45) Date of Patent: Jul. 31, 2018

(54) SECURE PERFORMANCE MONITORING OF REMOTE APPLICATION SERVERS

(71) Applicant: Red Hat, Inc., Raleigh, NC (US)

(72) Inventor: John J. Mazzitelli, Sicklerville, NJ (US)

(73) Assignee: Red Hat, Inc., Raleigh, NC (US)

( * ) Notice: Subject to any disclaimer, the term of this patent is extended or adjusted under 35 U.S.C. 154(b) by 188 days.

(21) Appl. No.: 15/056,234

(22) Filed: Feb. 29, 2016

(65) Prior Publication Data

US 2017/0251019 A1 Aug. 31, 2017

(51) Int. Cl.
*H04L 29/06* (2006.01)

(52) U.S. Cl.
CPC ........ *H04L 63/168* (2013.01); *H04L 63/0435* (2013.01); *H04L 63/0823* (2013.01); *H04L 63/0876* (2013.01)

(58) Field of Classification Search
CPC ............... H04L 63/168; H04L 63/0435; H04L 63/0823; H04L 63/0876
USPC ........................................................ 713/152
See application file for complete search history.

(56) References Cited

U.S. PATENT DOCUMENTS

| | | | |
|---|---|---|---|
| 7,891,000 B1* | 2/2011 | Rangamani | G06F 21/552 709/224 |
| 8,291,224 B2 | 10/2012 | Pelton et al. | |
| 8,463,885 B2 | 6/2013 | DeHaan | |
| 9,129,104 B2 | 9/2015 | Ferwerda et al. | |
| 9,141,512 B2 | 9/2015 | Eliáš et al. | |
| 9,189,206 B2 | 11/2015 | Eliáš et al. | |
| 2012/0042164 A1* | 2/2012 | Gagnon | H04L 43/04 713/168 |
| 2016/0013989 A1 | 1/2016 | Chouhan | |
| 2017/0091463 A1* | 3/2017 | Lindteigen | G06F 21/602 |

OTHER PUBLICATIONS

Author Unknown, "DB: 3.90: Wildfly 8.0 Ssl Configuration Using Pem mx," HivMr, 2015, Date Accessed: Feb. 8, 2016, 65 pages, http://www.hivmr.com/db/pd18x7j9j9faac7s19caa8mck13zkkc3.
Author Unknown, "Securing AS 7 applications using the ApplicationRealm," Mastertheboss.com, May 9, 2015, 3 pages, http://www.mastertheboss.com/jboss-server/jboss-security/securing-as-7-applications-using-the-applicationrealm.
Author Unknown, "What is WildFly?" Red Hat, Inc., Date Accessed: Feb. 8, 2016, 6 pages, http://wildfly.org/about/.
(Continued)

*Primary Examiner* — Mohammad W Reza
(74) *Attorney, Agent, or Firm* — Withrow & Terranova, PLLC

(57) ABSTRACT

Mechanisms for obtaining performance metric information securely are provided. A first application server executing on a computing device comprising a processor establishes that communications with a plurality of remote application servers utilize an encrypted communication protocol. Iteratively, over a period of time, each respective remote application server of the plurality of remote application servers is sent an encrypted message requesting performance metric information of the respective remote application server using the encrypted communication protocol. Over the period of time, encrypted requested performance metric information is received. The requested performance metric information is stored in a storage device.

16 Claims, 5 Drawing Sheets

(56) References Cited

OTHER PUBLICATIONS

Lofthouse, Darran, "Security Realms," WildFly 8, Project Documentation Editor, Last Edited: Feb. 5, 2015, 20 pages, https://docs.jboss.org/author/display/WFLY8/Security+Realms.

Pai, Jaikiran, "Remote JMX access to WildFly (or JBoss AS7) using JConsole," Dzone/Java Zone, Jan. 5, 2015, 4 pages, https://dzone.com/articles/remote-jmx-access-wildfly-or.

\* cited by examiner

US 10,038,717 B2

SECURE PERFORMANCE MONITORING OF REMOTE APPLICATION SERVERS

TECHNICAL FIELD

The examples relate generally to monitoring of application servers, and in particular to secure performance monitoring of remote application servers.

BACKGROUND

Application servers are increasingly used to simplify application development, to facilitate application distribution, for scalability purposes, and for a variety of other reasons. Responsiveness and throughput of applications running inside an application server may be affected based on the performance of the application server. Consequently, application server monitoring is increasingly important to ensure the application server has sufficient resources to support the applications that execute in the application server.

Often an organization has multiple application servers, and it may therefore be desirable to remotely monitor the application servers such that a single monitoring agent can consolidate the performance metric data obtained from the application servers.

It would be desirable for such communications to be secure, such as being encrypted, so that the performance metric data cannot be accessed by unintended recipients and used for undesirable purposes.

SUMMARY

The examples relate to mechanisms for obtaining performance metric information of remote application servers securely. In one example, a method for obtaining performance metric information securely is provided. The method includes establishing, by a first application server on a computing device comprising a processor, that communications with a plurality of remote application servers utilize an encrypted communication protocol. The method further includes iteratively, over a period of time, sending each respective remote application server of the plurality of remote application servers an encrypted message requesting performance metric information of the respective remote application server using the encrypted communication protocol. The method further includes receiving, over the period of time, encrypted requested performance metric information. The method further includes effecting storage of the requested performance metric information in a storage device.

In another example, a computing device is provided. The computing device includes a memory and a processor device coupled to the memory. The processor is to establish, by a first application server, that communications with a plurality of remote application servers utilize an encrypted communication protocol. The processor is further to iteratively, over a period of time, send each respective remote application server of the plurality of remote application servers an encrypted message requesting performance metric information of the respective remote application server using the encrypted communication protocol. The processor is further to receive, over the period of time, encrypted requested performance metric information, effect storage of the requested performance metric information in a storage device.

In another embodiment a computer program product for obtaining performance metric information securely is provided. The computer program product is stored on a non-transitory computer-readable storage medium and includes instructions to cause a processor device to carry out the step of establishing, by a first application server, that communications with a plurality of remote application servers utilize an encrypted communication protocol. The instructions further cause the processor device to carry out the step of iteratively, over a period of time, sending each respective remote application server of the plurality of remote application servers an encrypted message requesting performance metric information of the respective remote application server using the encrypted communication protocol. The instructions further cause the processor device to carry out the steps of receiving, over the period of time, encrypted requested performance metric information, effecting storage of the requested performance metric information in a storage device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first security realm" and "second security realm," and does not imply a priority, a type, an importance, or other attribute, unless otherwise stated herein.

As used herein and in the claims, the articles "a" and "an" in reference to an element refer to "one or more" of the element unless otherwise explicitly specified.

Figure 1:
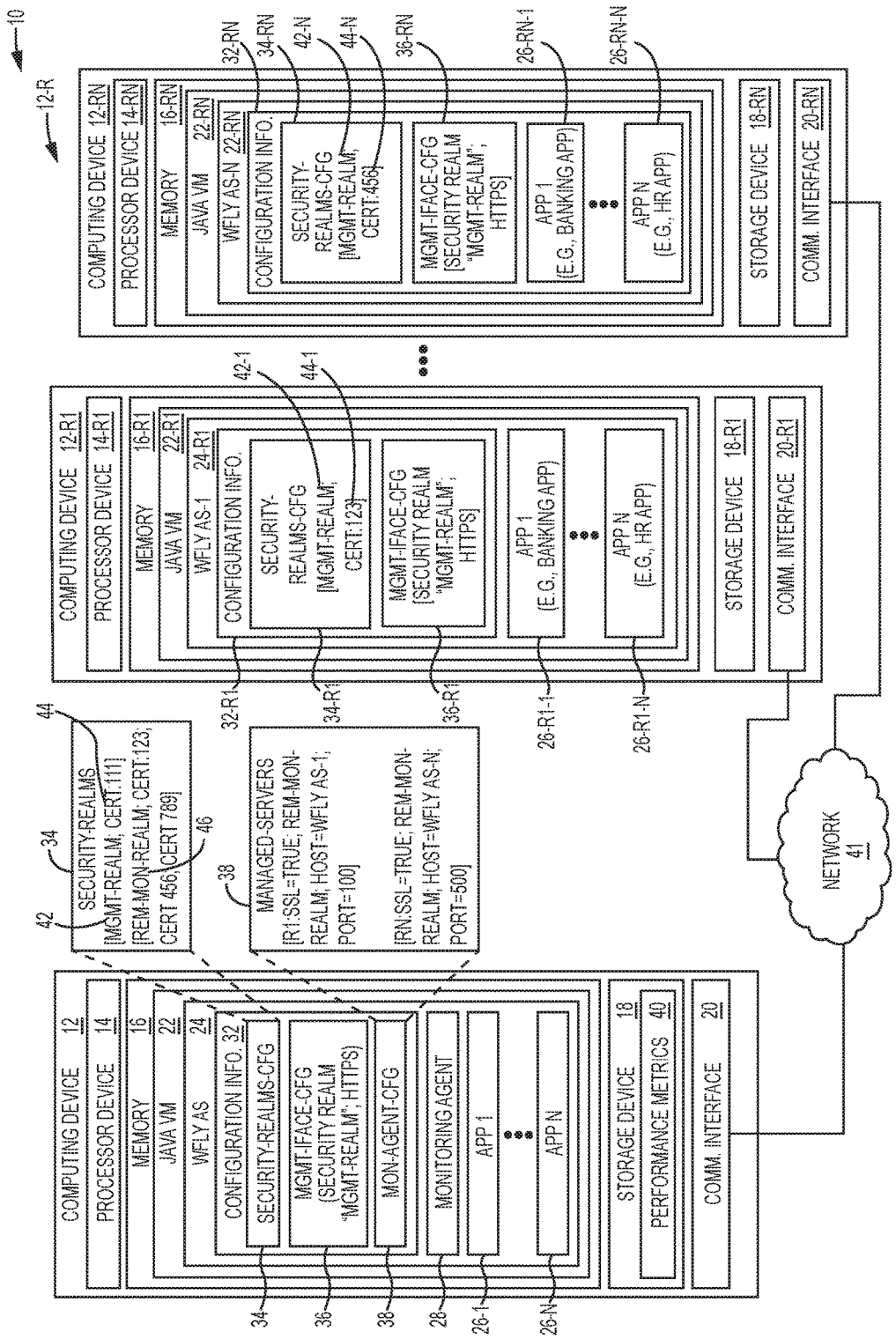
FIG. 1 is a block diagram of an environment in which examples can be practiced.

FIG. 1 is a block diagram of an environment 10 in which examples can be practiced. The environment 10 includes a computing device 12, which includes a processor device 14, a memory 16, a storage device 18 and a communication interface 20. The memory 16 includes a Java virtual machine (VM) 22. While only one Java VM is illustrated, any number of Java VMs 22 may be executing in the memory 16. The Java VM 22 includes an application server 24 that provides services to one or more applications 26-1-26-N (generally applications 26). The phrase "application server" is used herein to refer to a middle ware execution environment that provides services to applications, such as, by way of non-limiting example, database connectivity and access, session security, state maintenance, and the like. The examples are disclosed herein using a particular application server as an example, in particular the WildFly application server. The WildFly application server is written in Java, and implements the Java Platform, Enterprise Edition (Java EE) specification, and runs on multiple platforms. As will be discussed in greater detail herein, the WildFly application server configures secure communications in part through a "security realms" configuration mechanism that binds certain communications to certain digital certificates. However, the examples are not limited to the WildFly application server, and have applicability with any application server that configures secure communications in part through a configuration mechanism that binds certain communications to certain digital certificates.

The applications 26 may comprise any useful or desired application, such as, by way of non-limiting example, a human resources application, a customer relations application, a billing application, and the like. The application server 24 also provides services to a monitoring agent 28. As will be discussed in greater detail below, the monitoring agent 28 iteratively polls other application servers to obtain performance metric information of the respective application servers. The monitoring agent 28 may also obtain performance metric information of the application server 24.

The memory 16 also includes configuration information 32. The configuration information 32 includes security realms configuration data 34, management interface configuration data 36, and monitoring agent configuration data 38, each of which will be discussed in greater detail below. The monitoring agent 28, in one example, stores obtained performance metrics 40 in the storage device 18. In other examples, the monitoring agent 28 may effect storage of the performance metrics 40 in another storage device maintained by a different computing device.

The environment 10 also includes a plurality of remote computing devices 12-R1-12-RN (generally, computing devices 12-R). The term "remote" is used herein simply to refer to any computing devices other than the computing device 12, and does not imply a geographic distance. The computing devices 12 and 12-R may communicate with one another via one more networks 41. The computing device 12-R1 includes a processor device 14-R1, a memory 16-R1, a storage device 18-R1 and a communication interface 20-R1. The memory 16-R1 includes a Java virtual machine (VM) 22-R1. While only one Java VM 22-R1 is illustrated, any number of Java VMs 22-R1 may be executing in the memory 16-R1. The Java VM 22-R1 includes an application server 24-R1 that provides services to one or more applications 26-R1-1-26-R1-N (generally applications 26-R1). The memory 16-R1 also includes configuration information 32-R1. The configuration information 32-R1 includes security realms configuration data 34-R1 and management interface configuration data 36-R1, each of which will be discussed in greater detail below.

The computing device 12-RN may have substantially similar characteristics as the computing device 12-R1. In particular, the computing device 12-RN includes a processor device 14-RN, a memory 16-RN, a storage device 18-RN and a communication interface 20-RN. The memory 16-RN includes a Java virtual machine (VM) 22-RN. While only one Java VM 22-RN is illustrated, any number of Java VMs 22-RN may be executing in the memory 16-RN. The Java VM 22-RN includes an application server 24-RN that provides services to one or more applications 26-RN-1-26-RN-N (generally applications 26-RN). The application servers 24-R1-24-RN may be referred to herein generally as application servers 24-R, or as remote application servers 24-R, to distinguish such application servers from the application server 24. The memory 16-RN also includes configuration information 32-RN. The configuration information 32-RN includes security realms configuration data 34-RN and management interface configuration data 36-RN, each of which will be discussed in greater detail below.

While for purposes of illustration only two remote computing devices 12-R are illustrated, it will be appreciated that the examples have applicability with any number of computing devices 12-R, such as hundreds or thousands of computing devices 12-R.

The application servers 24-R1 and 24-RN each implement a management interface that allows external components to interface with the application servers 24-R1 and 24-RN. In order to ensure such incoming interactions are encrypted, the security realms configuration data 34-R1 contains a management security realm 42-1 ("MGMT-REALM") and identifies a keystore 44-1 ("123") that contains the digital certificate of the application server 24-R1. As will be discussed in greater detail herein, the digital certificate may be used by the monitoring agent 28 to encrypt messages destined for the application server 24-R1. The keystore 44-1 also contains the matching private key that can be used by the application server 24-R1 to decrypt messages that have been encrypted by the monitoring agent 28.

While the particular security realms configuration data 34-R1 may differ depending on the particular application server 24, in a WildFly application server example, the security realms configuration data 34-R1 may be similar to that provided below in Table 1.

TABLE 1

<management>
  <security-realms>
    <security-realm name="Mgmt-Realm">
     ...
     <server-identities>
      <ssl>
       <keystore path="your-wildfly.keystore" relative-to="jboss.server.config.dir" keystore-password="your-password" key-password="your-password" alias="your-alias" />
      </ssl>
     </server-identities>
    </security-realm>

The management interface configuration data 36-R1 binds the management interface of the application server 24-R1 to the management security realm 42-1 ("MGMT-REALM") and directs the application server 24-R1 to use the secure protocol HTTPS for incoming connections. While the particular management interface configuration data 36-R1 may differ depending on the particular application server 24, in a WildFly application server example, the management interface configuration data 36-R1 may be similar to that provided below in Table 2.

TABLE 2

```
<management-interfaces>
    <http-interface http-upgrade-enabled="true" security-realm="Mgmt-Realm">
        <socket-binding https="management-https">
    </http-interface>
</management-interfaces>
```

The application server 24-RN, and any other application servers 24-R being monitored by the monitoring agent 28, will be configured similarly. In particular, the security realms configuration data 34-R2 contains a management security realm 42-N ("MGMT-REALM") and identifies a keystore 44-N ("456") that contains the digital certificate of the application server 24-RN. As discussed above, the digital certificate may be used by the monitoring agent 28 to encrypt messages destined for the application server 24-RN. The keystore 44-N also contains the matching private key that can be used by the application server 24-RN to decrypt messages that have been encrypted by the monitoring agent 28. The format of the security realms configuration data 34-RN and the management interface configuration data 36-RN may be substantially similar or identical to that shown above in Tables 1 and 2, respectively.

The security realms configuration data 34 of the application server 24 may also include a management security realm 42 ("MGMT-REALM") and identify a keystore 44 ("111") that contains the digital certificate of the application server 24. The management security realm 42 ("MGMT-REALM") is used to ensure that incoming requests to the application server 24 are required to be encrypted with the digital certificate of the application server 24. The security realms configuration data 34 also includes an additional remote monitoring security realm 46 ("REM-MON-REALM") for use for outgoing messages generated by the monitoring agent 28. The remote monitoring security realm 46 identifies a keystore that contains the public certificates 48-1, 48-N ("123","456") of the application server 24-R1 and 24-RN, respectively. In a WildFly application server example, the security realms configuration data 34 may be similar to that provided below in Table 3.

TABLE 3

```
<management>
    <security-realms>
        <security-realm name="Mgmt-Realm">
            ...
            <server-identities>
                <ssl>
                    <keystore path="incoming.keystore" relative-to="jboss.server.config.dir" keystore-password="your-password" key-password="your-password" alias="your-alias"/>
                </ssl>
            </server-identities>
        </security-realm>
        <security-realm name="REM-MON-REALM">
            <server-identities>
                <ssl>
                    <keystore path="outgoing.keystore" relative-to="jboss.server.config.dir" keystore-password="your-password" key-password="your-password" alias="your-alias"
```

TABLE 3-continued

```
                    />
                </ssl>
            </server-identities>
        </security-realm>
```

The management interface configuration data 36 binds the management interface of the application server 24 to the management security realm 42 ("MGMT-REALM") and directs the application server 24 to use the secure protocol HTTPS for incoming connections. In a WildFly application server example, the management interface configuration data 36 may be similar to that provided above in Table 2.

The monitoring agent configuration data 38 identifies the application servers 24-R that are going to be monitored and ties communications with the application servers 24-R to the remote monitoring security realm 46 ("REM-MON-REALM") to encrypt outgoing messages generated by the monitoring agent 28. Each application server 24-R may be identified, for example, via a hostname or internet protocol address, and a port number. In a WildFly application server example, the monitoring agent configuration data 38 may be similar to that provided below in Table 4.

TABLE 4

```
<managed-servers>
    <remote-dmr useSSL="true" securityRealm="REM-MON-REALM", HOST = WFLY AS-1, PORT = 1OO ... />
    <remote-dmr useSSL="true" securityRealm=" REM-MON-REALM " HOST = WFLY AS-N, PORT = 5OO... />
```

Figure 2:
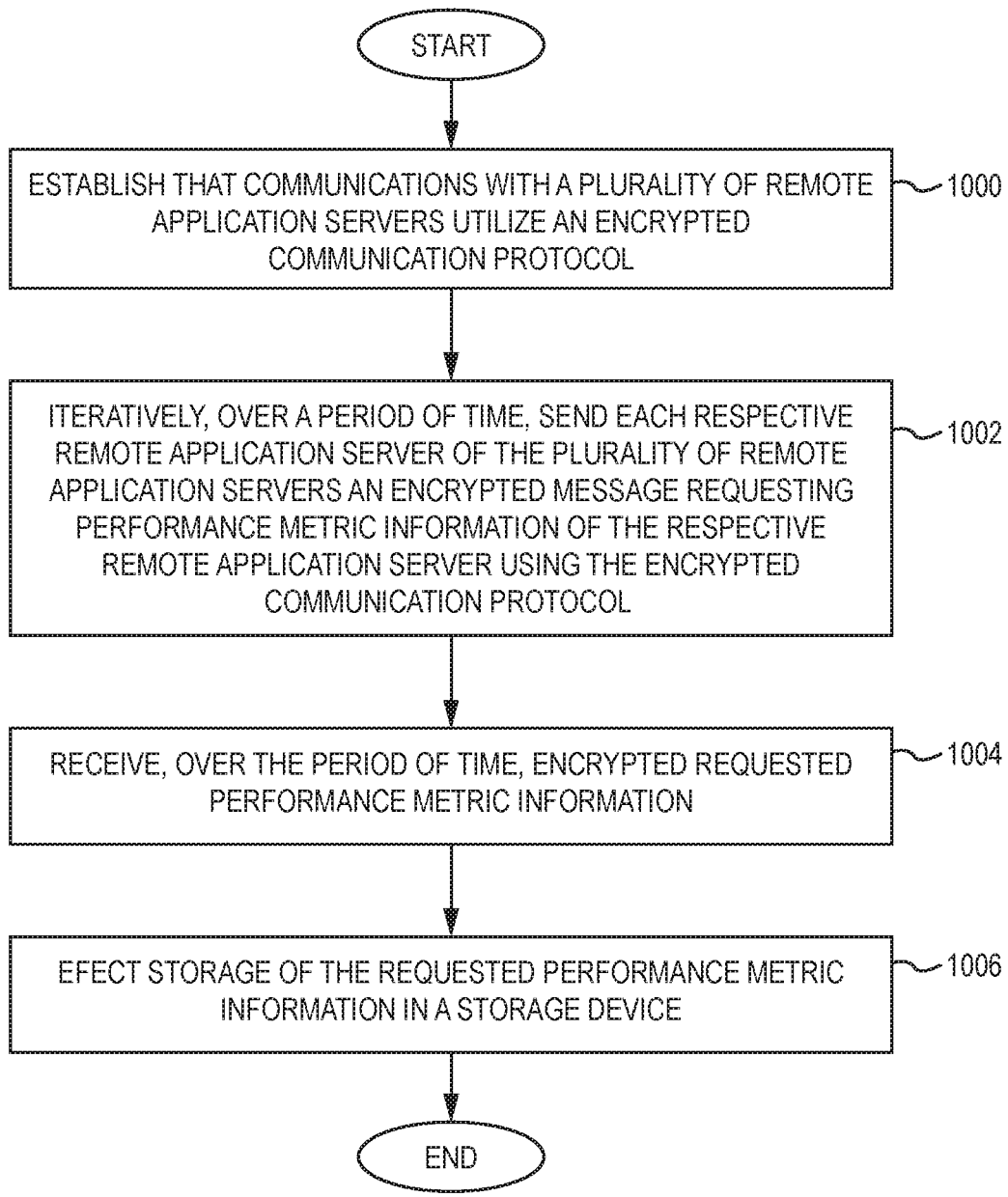
FIG. 2 is a flowchart of a method for obtaining performance metric information securely, according to one example.

FIG. 2 is a flowchart of a method for obtaining performance metric information securely, according to one example, and will be discussed in conjunction with FIG. 1. The application server 24 establishes that outgoing communications with the plurality of remote application servers 24-R utilize an encrypted communication protocol (FIG. 2, block 1000). In one example, the establishment of secure outgoing communications may be effected in the manner discussed above, by generating the security realms configuration data 34 and the monitoring agent configuration data 38. Iteratively, over a period of time, the monitoring agent 28 sends each respective remote application server 24-R an encrypted message requesting performance metric information of the respective remote application server 24-R using the encrypted communication protocol (FIG. 2, block 1002). In response to the message, each remote application server 24-R iteratively provides to the monitoring agent 28 encrypted requested performance metric information 40. The monitoring agent 28 receives, over the period of time, encrypted requested performance metric information 40, decrypts the encrypted requested performance metric information 40, and effects storage of the requested performance metric information 40 (FIG. 2, blocks 1004, 1006).

The performance metric information 40 can comprise any desirable metrics. By way of non-limiting example, the performance metric information 40 may include any one or more of the metrics identified below in Table 5.

TABLE 5

```
memory metrics
    heap-memory-usage
    heap-memory-usage#committed
    heap-memory-usage#max
    non-heap-memory-usage#used
```

TABLE 5-continued

```
        non-heap-memory-usage#committed
        collection-time
    threading metrics
        thread-count
Aggregrated Web Metrics
    active-sessions
    max-active-sessions
    expired-sessions
    rejected-sessions
    total-request-time
    request-count
Undertow Metrics
    active-sessions
    sessions-created
    expired-sessions
    rejected-sessions
    max-active-sessions
Servlet metrics
    max-request-time
    min-request-time
    total-request-time
    request-count
    execution-time
    invocations
    peak-concurrent-invocations
    wait-time
Message driven EJB metrics
    execution-time
    invocations
    peak-concurrent-invocations
    wait-time
    pool-available-count
    pool-create-count
    pool-current-size
    pool-max-size
    pool-remove-count
Datasource JDBC Metrics
    PreparedStatementCacheAccessCount
    PreparedStatementCacheAddCount
    PreparedStatementCacheCurrentSize
    PreparedStatementCacheDeleteCount
    PreparedStatementCacheHitCount
    PreparedStatementCacheMissCount
Datasource Pool Metrics
    Activecount
    AvailableCount
    AverageBlockingTime
    AverageCreationTime
    AverageGetTime
    BlockingFailureCount
    CreatedCount
    DestroyedCount
    IdleCount
    InUseCount
    MaxCreationTime
    MaxGetTime
    MaxUsedCount
    MaxWaitCount
    MaxWaitTime
    TimedOut
    TotalBlockingTime
    TotalCreationTime
    TotalGetTime
    WaitCount
Transactions Metrics
    number-of-aborted-transactions
    number-of-application-rollbacks
    number-of-committed-transactions
    number-of-heuristics
    number-of-inflight-transactions
    number-of-nested-transactions
    number-of-resource-rollbacks
    number-of-timed-out-transactions
    number-of-transactions
JMS Queue Metrics
    consumer-count
    delivering-count
    message-count
    messages-added
    scheduled-count
```

TABLE 5-continued

```
    JMS Topic Metrics
        durable-message-count
        durable-subscription-count
        delivering-count
        message-count
        messages-added
        non-durable-subscription-count
        subscription-count
    Server Availability
        server-state
        status
```

Figure 3:
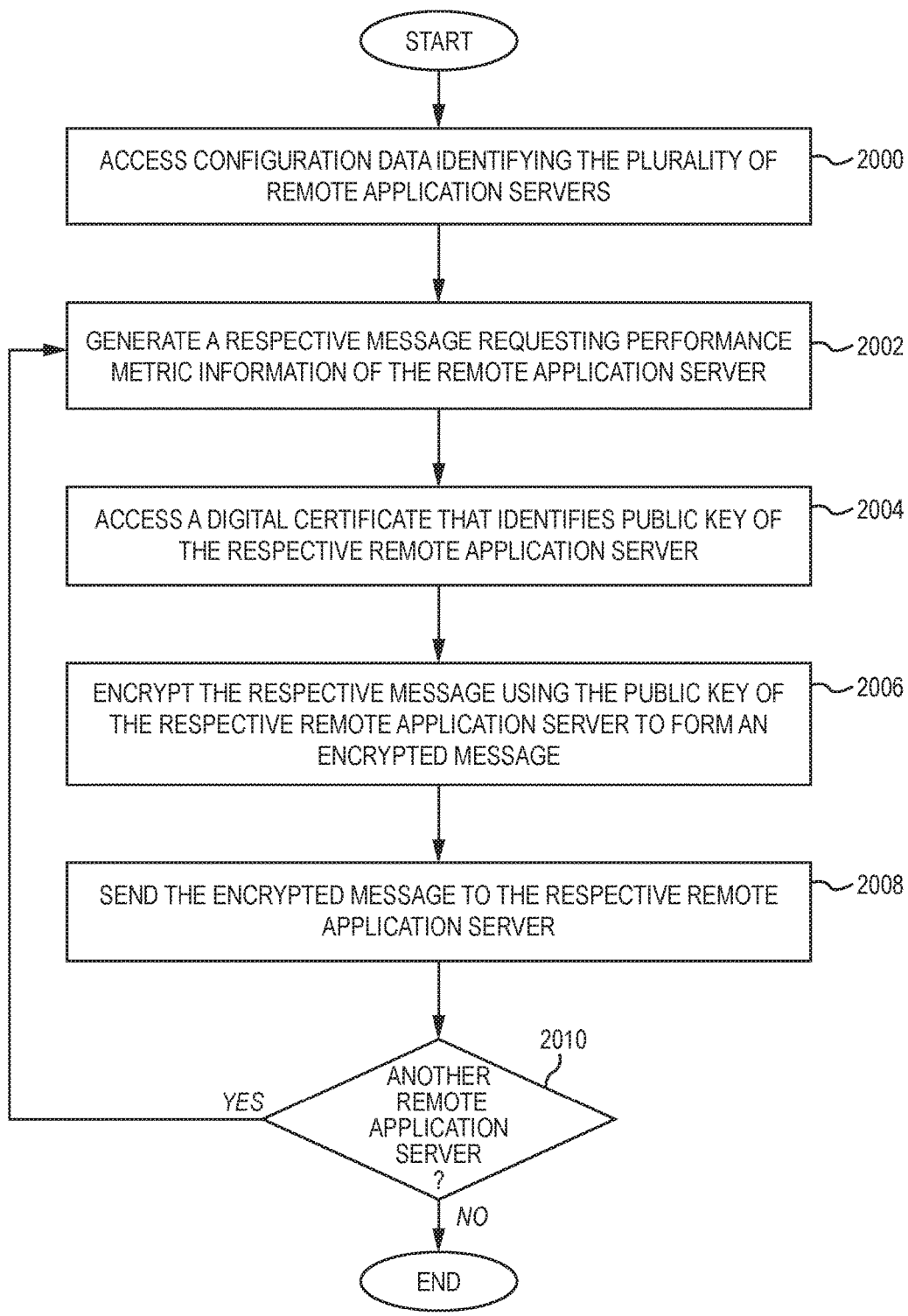
FIG. 3 is a flowchart of a detailed method by which a monitoring agent may iteratively send encrypted messages requesting performance metric information of a remote application server using an encrypted communication protocol, according to one example.

FIG. 3 is a flowchart of a detailed method for implementing block 1002 of FIG. 2, according to one example, by which the monitoring agent 28 may iteratively send encrypted messages requesting performance metric information of the respective remote application server 24-R using the encrypted communication protocol. The monitor agent 28 accesses the monitoring agent configuration data 38 that identifies the plurality of remote application servers 24-R (FIG. 3, block 2000). Starting with the first application server 24-R identified in the monitoring agent configuration data 38, the monitoring agent 28 generates a respective message requesting performance metric information of the remote application server 24-R (FIG. 3, block 2002). The digital certificate that identifies a public key of the respective remote application server 24-R is accessed by virtue of the security realms configuration data 34 and the monitoring agent configuration data 38 (FIG. 3, block 2004). The respective message is encrypted using the public key of the respective remote application server 24-R to form an encrypted message (FIG. 3, block 2006). The monitoring agent 28 sends the encrypted message to the respective remote application server 24-R (FIG. 3, block 2008). If another application server 24-R is identified in the monitoring agent configuration data 38, the process returns to block 2002 and is repeated for that application server 24-R (FIG. 3, block 2010). If not, this round of messages is complete.

The monitoring agent 28 may send such messages at any desired periodic interval, such as, by way of non-limiting example, a periodic interval of less than one second, of one or more seconds, of less than one minute, or of one or more minutes. The periodic interval may be a configurable periodic interval and may be identified in the configuration information 32.

Figure 4:
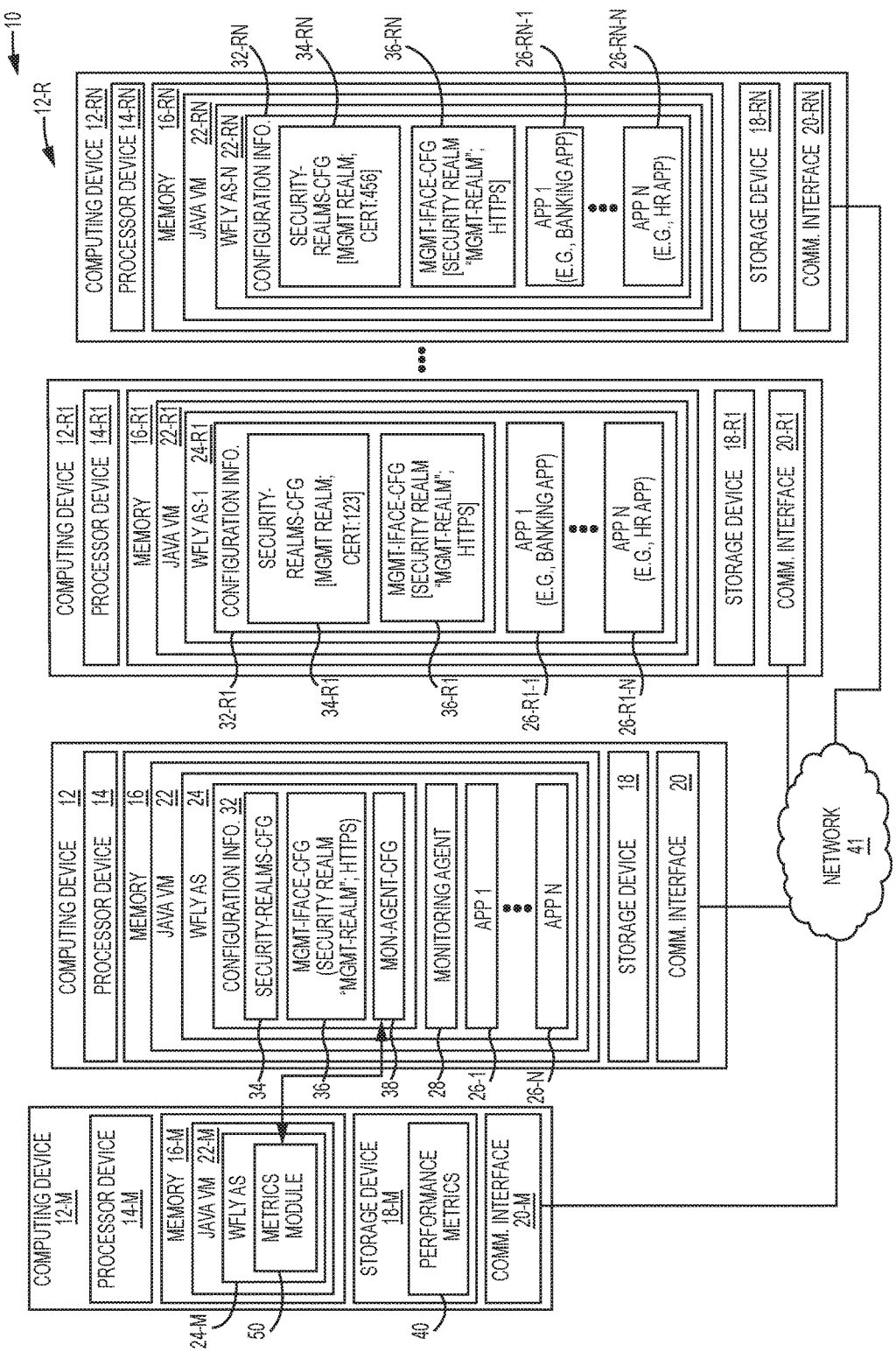
FIG. 4 is a block diagram of an environment in which examples can be practiced.

FIG. 4 is a block diagram of an environment 10-1 in which examples can be practiced. The environment 10-1 is substantially similar to the environment 10 and common elements labeled in both FIGS. 1 and 4 will not be discussed herein for purposes of brevity. The environment 10-1, however, includes another computing device 12-M, which includes a processor device 14-M, a memory 16-M, a storage device 18-M and a communication interface 20-M. The memory 16-M includes a Java virtual machine (VM) 22-M. While only one Java VM is illustrated, any number of Java VMs 22-M may be executing in the memory 16-M. The Java VM 22-M includes an application server 24-M that provides services to a metrics module 50.

The metrics module 50 communicates with the monitoring agent 28. Thus, in this example, the monitoring agent 28 effects storage of the requested performance metric information 40 by communicating the requested performance metric information 40 to the metrics module 50. The metrics module 50 may then store the requested performance metric information 40 in the storage device 18-M. The metrics module 50 may concurrently or subsequently analyze the performance metric information 40 and generate information for presentation to an operator. Such information may be graphical, textual, or in any other desired format. The metrics module 50 may also communicate one or more alerts to the operator identifying non-desirable conditions on an application server 24 based on the performance metric information 40.

Figure 5:
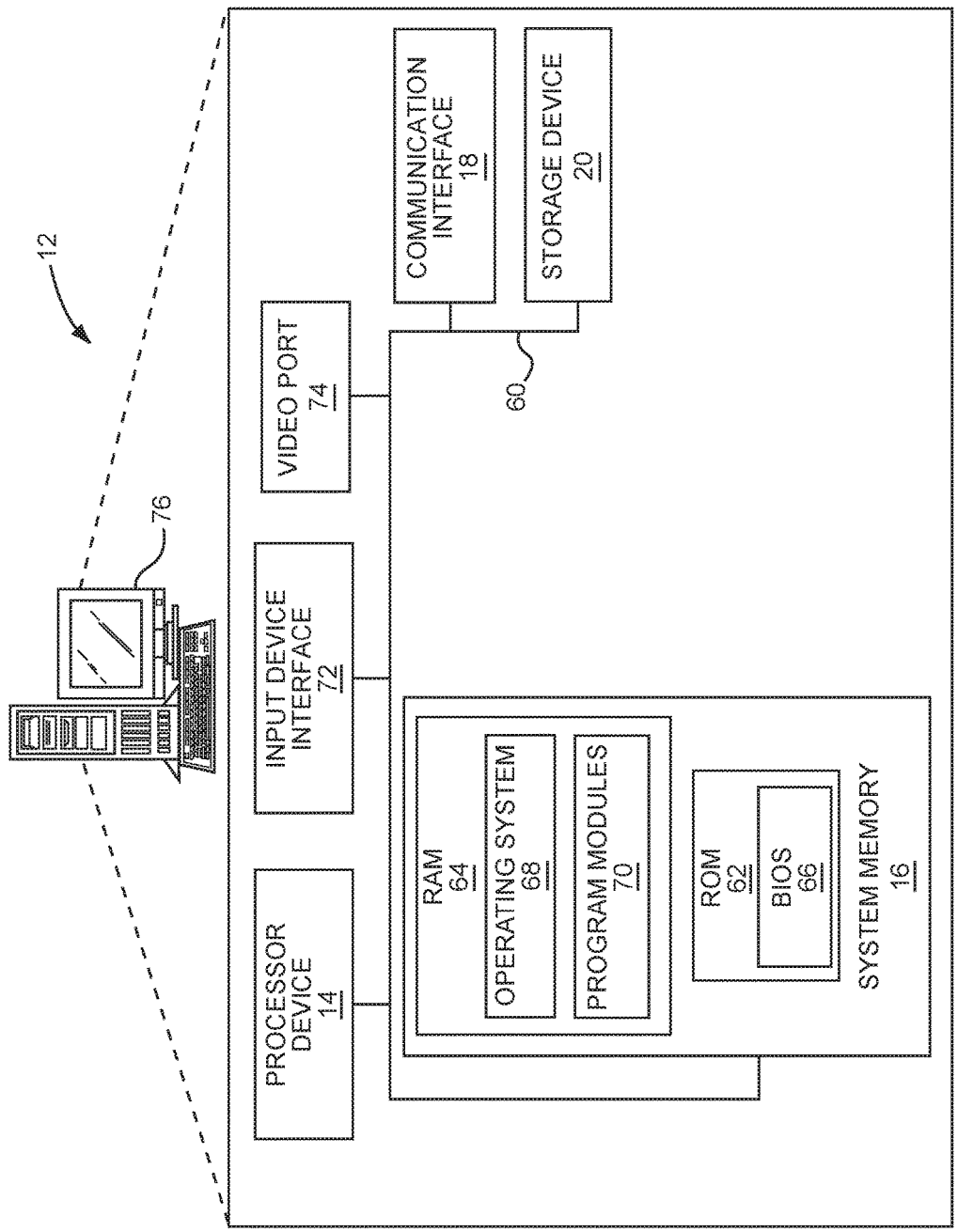
FIG. 5 is a block diagram of the computing device suitable for implementing examples according to one example.

FIG. 5 is a block diagram of the computing device 12 suitable for implementing examples according to one example. The computing device 12 may comprise any computing or electronic device capable of including firmware, hardware, and/or executing software instructions to implement the functionality described herein, such as a computer server device, a desktop computing device, or the like. The computing device 12 includes the processor device 14, the system memory 16, and a system bus 60. The system bus 60 provides an interface for system components including, but not limited to, the system memory 16 and the processor device 14. The processor device 14 can be any commercially available or proprietary processor.

The system bus 60 may be any of several types of bus structures that may further interconnect to a memory bus (with or without a memory controller), a peripheral bus, and/or a local bus using any of a variety of commercially available bus architectures. The system memory 16 may include non-volatile memory 62 (e.g., read-only memory (ROM), erasable programmable read-only memory (EPROM), electrically erasable programmable read-only memory (EEPROM), etc.), and/or volatile memory 64 (e.g., random-access memory (RAM)). A basic input/output system (BIOS) 66 may be stored in the non-volatile memory 62 and can include the basic routines that help to transfer information between elements within the computing device 12. The volatile memory 64 may also include a high-speed RAM, such as static RAM, for caching data.

The computing device 12 may further include or be coupled to the non-transitory computer-readable storage medium or storage device 18, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 18 and other drives associated with computer-readable media and computer-usable media may provide non-volatile storage of data, data structures, computer-executable instructions, and the like, including, for example, the configuration information 32. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 18 and in the volatile memory 64, including an operating system 68 and one or more program modules 70, which may implement the functionality described herein in whole or in part, including, for example, the functionality described herein with regard to the monitoring agent 28. It is to be appreciated that the examples can be implemented with various commercially available operating systems 68 or combinations of operating systems 68.

All or a portion of the examples may be implemented as a computer program product stored on a transitory or non-transitory computer-usable or computer-readable storage medium, such as the storage device 18, which includes complex programming instructions, such as complex computer-readable program code, configured to cause the processor device 14 to carry out the steps described herein. Thus, the computer-readable program code can comprise software instructions for implementing the functionality of the examples described herein when executed on the processor device 14. The processor device 14, in conjunction with the program modules 70 in the volatile memory 64, may serve as a controller, or control system, for the computing device 12 that is configured to, or adapted to, implement the functionality described herein.

An operator or other user may also be able to enter one or more configuration commands through a keyboard (not illustrated), a pointing device such as a mouse (not illustrated), or a touch-sensitive surface (not illustrated). Such input devices may be connected to the processor device 14 through an input device interface 72 that is coupled to the system bus 60 but can be connected by other interfaces such as a parallel port, an Institute of Electrical and Electronic Engineers (IEEE) 1394 serial port, a Universal Serial Bus (USB) port, an IR interface, and the like.

The computing device 12 also includes the communication interface 20 suitable for communicating with the network 41 as appropriate or desired. The computing device 12 may also include a video port 74 configured to interface with a display 76, to provide the operator or user information during the examples disclosed herein.

Among other advantages, the examples implement secure outgoing communications for use in iterative outgoing requests for performance metric information from a plurality of remote monitored application servers.

Individuals will recognize improvements and modifications to the examples of the disclosure. All such improvements and modifications are considered within the scope of the concepts disclosed herein and the claims that follow.

What is claimed is:

1. A method for obtaining performance metric information securely, comprising:

establishing, by a first application server on a computing device comprising a processor, that communications with a plurality of remote application servers utilize an encrypted communication protocol;

iteratively, over a period of time, sending, over a communications network, each respective remote application server of the plurality of remote application servers an encrypted message requesting performance metric information of the respective remote application server using the encrypted communication protocol, by:

accessing configuration data identifying the plurality of remote application servers; and for each respective remote application server of the plurality of remote application servers identified in the configuration data:

generating a respective message requesting the performance metric information of the remote application server;

accessing a digital certificate that identifies a public key of the respective remote application server;

encrypting the respective message using the public key of the respective remote application server to form the encrypted message; and sending the encrypted message to the respective remote application server;

receiving, over the period of time, encrypted requested performance metric information; and effecting storage of the requested performance metric information in a storage device.

2. The method of claim 1 wherein the application server comprises a first security realm established for incoming messages and a second security realm established for outgoing messages.

3. The method of claim 1 further comprising obtaining performance metric information from the application server and effecting storage of the performance metric information in the storage device.

4. The method of claim 1 wherein the first application server is one of a plurality of application servers executing on the computing device.

5. The method of claim 1 wherein iteratively, over the period of time, sending each respective remote application server of the plurality of remote application servers the encrypted message requesting performance metric information of the respective remote application server using the encrypted communication protocol further comprises:
   iteratively, over the period of time, sending, by a monitoring agent running in the first application server, each respective remote application server of the plurality of remote application servers the encrypted message requesting performance metric information of the respective remote application server using the encrypted communication protocol; and
   wherein the first application server provides a plurality of core services to the monitoring agent and to a plurality of applications executing in the first application server, the core services including managing database access for the monitoring agent and the plurality of applications.

6. The method of claim 1 further comprising executing the first application server in a JAVA virtual machine.

7. The method of claim 1 further comprising establishing, in each remote application server of the plurality of remote application servers, that incoming messages be encrypted with the public key of the respective remote application server.

8. The method of claim 7 wherein establishing that the communications with the plurality of remote application servers utilize the encrypted communication protocol further comprises storing the public key of each remote application server in a keystore.

9. The method of claim 1 wherein effecting storage of the requested performance metric information in the storage device comprises storing the requested performance metric information in the storage device.

10. The method of claim 1 wherein effecting storage of the requested performance metric information in the storage device comprises communicating the requested performance metric information to a remote monitoring module executing on a remote computing device to store the requested performance metric information in a storage device of the remote computing device.

11. A computing device comprising:
   a memory;
   a processor device coupled to the memory to:
      establish, by a first application server, that communications with a plurality of remote application servers utilize an encrypted communication protocol;
      iteratively, over a period of time, send, over a communications network, each respective remote application server of the plurality of remote application servers an encrypted message requesting performance metric information of the respective remote application server using the encrypted communication protocol, by:
         accessing configuration data identifying the plurality of remote application servers; and
         for each respective remote application server of the plurality of remote application servers identified in the configuration data:
            generating a respective message requesting the performance metric information of the remote application server;
            accessing a digital certificate that identifies a public key of the respective remote application server;
            encrypting the respective message using the public key of the respective remote application server to form the encrypted message; and
            sending the encrypted message to the respective remote application server;
      receive, over the period of time, encrypted requested performance metric information; and
      effect storage of the requested performance metric information in a storage device.

12. The computing device of claim 11 wherein the application server comprises a first security realm established for incoming messages and a second security realm established for outgoing messages.

13. The computing device of claim 11 wherein the processor is further to obtain performance metric information from the application server, and effect storage of the performance metric information in the storage device.

14. A computer program product for obtaining performance metric information securely, the computer program product stored on a non-transitory computer-readable storage medium and including instructions to cause a processor device to carry out steps of:
   establishing, by a first application server, that communications with a plurality of remote application servers utilize an encrypted communication protocol;
   iteratively, over a period of time, sending, over a communications network, each respective remote application server of the plurality of remote application servers an encrypted message requesting performance metric information of the respective remote application server using the encrypted communication protocol, by:
      accessing configuration data identifying the plurality of remote application servers; and
      for each respective remote application server of the plurality of remote application servers identified in the configuration data:
         generating a respective message requesting the performance metric information of the remote application server;
         accessing a digital certificate that identifies a public key of the respective remote application server;
         encrypting the respective message using the public key of the respective remote application server to form the encrypted message; and
         sending the encrypted message to the respective remote application server;
   receiving, over the period of time, encrypted requested performance metric information; and
   effecting storage of the requested performance metric information in a storage device.

15. The computer program product of claim 14 wherein the application server comprises a first security realm established for incoming messages and a second security realm for outgoing messages.

16. The computer program product of claim 14 wherein the instructions further cause the processor to carry out the steps of obtaining performance metric information from the application server and effecting storage of the performance metric information in the storage device.

* * * * *